(12) United States Patent
Ye et al.

(10) Patent No.: US 7,837,876 B2
(45) Date of Patent: Nov. 23, 2010

(54) WATER PURIFYING APPARATUSES

(75) Inventors: Jinwan Ye, Fujian (CN); David Swain, Palm Harbor, FL (US); Edward C. Giordano, Fort Collins, CO (US)

(73) Assignees: Paragon Water Systems, Inc., Clearwater, FL (US); Xiamen Runner Industrial Corporation, Fujian (CN)

( * ) Notice: Subject to any disclaimer, the term of this patent is extended or adjusted under 35 U.S.C. 154(b) by 1134 days.

(21) Appl. No.: 11/038,831

(22) Filed: Jan. 18, 2005

(65) Prior Publication Data
US 2006/0091047 A1 May 4, 2006

(30) Foreign Application Priority Data
Oct. 28, 2004 (CN) .................... 2004 2 0094564 U

(51) Int. Cl.
*B01D 35/30* (2006.01)
*B01D 35/153* (2006.01)
*B01D 29/00* (2006.01)
*B01D 35/00* (2006.01)
*B01D 35/28* (2006.01)

(52) U.S. Cl. .................. 210/234; 210/232; 210/235; 210/238; 210/418; 210/443

(58) Field of Classification Search .............. 210/493.1, 210/234, 235, 429, 109, 232, 238
See application file for complete search history.

(56) References Cited

U.S. PATENT DOCUMENTS

| | | | |
|---|---|---|---|
| 2,471,069 A | 5/1949 | Le Clair | |
| 2,208,754 A | 10/1957 | Pudio | |
| 2,858,026 A | 10/1958 | Lorimer | |
| 3,228,413 A | 1/1966 | Stevens, Jr. | |
| 3,746,171 A | 7/1973 | Thomsen | |
| 4,052,307 A | 10/1977 | Humbert, Jr. | |
| 4,077,876 A | 3/1978 | Southall | |
| 4,082,673 A | 4/1978 | Cilento | |
| 4,271,020 A | 6/1981 | Van Meter | |

(Continued)

FOREIGN PATENT DOCUMENTS

| | | |
|---|---|---|
| DE | 2458784 | 6/1976 |
| DE | 2719875 | 11/1978 |
| GB | 1566502 | 4/1980 |

*Primary Examiner*—Krishnan S Menon
*Assistant Examiner*—Benjamin Kurtz
(74) *Attorney, Agent, or Firm*—Greer, Burns & Crain, Ltd.

(57) ABSTRACT

A filter cartridge including a housing having a water inlet and outlet, a valve disposed in the housing and defining transversally aligned inlet and outlet passageways, and having a first key formation that vertically depends from the valve, a cartridge having transversely separated inlet and outlet ports transversely aligned relative to a longitudinal axis of the cartridge, each of the ports engageable in a corresponding one of the passageways, and a complementary key formation for engaging the first key formation for ensuring proper engagement of the ports in the passageways where the ports and the key formation project from a common plane. The valve is rotatable in the housing between an open position in which feed water passes through the inlet passageway and into the cartridge, and treated water flows to the outlet passageway, and a closed position in which water is prevented from flowing to and from the valve.

17 Claims, 7 Drawing Sheets

U.S. PATENT DOCUMENTS

| | | | |
|---|---|---|---|
| 4,515,692 A | 5/1985 | Chandler et al. | |
| 4,529,515 A | 7/1985 | Selz | |
| 4,615,800 A | 10/1986 | Stifelman et al. | |
| 4,615,812 A | 10/1986 | Darlling | |
| 4,735,716 A | 4/1988 | Petrucci et al. | |
| 4,877,521 A | 10/1989 | Petrucci et al. | |
| 4,915,831 A * | 4/1990 | Taylor | 210/232 |
| 4,956,086 A | 9/1990 | Thomsen et al. | |
| 5,022,986 A | 6/1991 | Lang | |
| 5,035,797 A | 7/1991 | Janik | |
| D321,394 S | 11/1991 | Petrucci et al. | |
| D322,836 S | 12/1991 | Petrucci et al. | |
| 5,135,645 A | 8/1992 | Sklenak et al. | |
| 5,256,285 A | 10/1993 | Tomita et al. | |
| 5,269,919 A | 12/1993 | Von Medlin | |
| 5,328,609 A | 7/1994 | Magnusson et al. | |
| 5,336,406 A | 8/1994 | Stanford et al. | |
| 5,354,464 A | 10/1994 | Magnusson et al. | |
| 5,390,701 A | 2/1995 | Lessley et al. | |
| 5,456,830 A | 10/1995 | Stanford et al. | |
| 5,460,719 A | 10/1995 | Clack et al. | |
| 5,486,288 A | 1/1996 | Stanford et al. | |
| 5,548,893 A | 8/1996 | Koelfgen | |
| 5,560,824 A | 10/1996 | Sann et al. | |
| 5,562,824 A | 10/1996 | Magnusson | |
| 5,590,687 A | 1/1997 | Vaughan | |
| 5,591,332 A | 1/1997 | Reid et al. | |
| 5,601,710 A | 2/1997 | Yoon et al. | |
| 5,695,168 A | 12/1997 | Williams | |
| 5,700,371 A | 12/1997 | Koslow | |
| 5,744,030 A | 4/1998 | Reid et al. | |
| 5,753,107 A | 5/1998 | Magnusson et al. | |
| 5,779,903 A | 7/1998 | Smith et al. | |
| 5,826,854 A * | 10/1998 | Janvrin et al. | 251/149.9 |
| D410,064 S | 5/1999 | Fabian et al. | |
| 5,914,037 A | 6/1999 | Yen | |
| 6,027,644 A | 2/2000 | Magnusson et al. | |
| 6,193,884 B1 | 2/2001 | Magnusson et al. | |
| 6,258,265 B1 | 7/2001 | Jones | |
| 6,360,764 B1 | 3/2002 | Fritze | |
| 6,458,269 B1 * | 10/2002 | Bassett et al. | 210/119 |
| 6,579,455 B1 * | 6/2003 | Muzik et al. | 210/234 |
| 6,615,990 B1 * | 9/2003 | Jokschas et al. | 210/457 |
| 6,649,056 B2 | 11/2003 | Fritze | |
| 7,407,148 B2 | 8/2005 | Bassett et al. | |
| 6,949,189 B2 | 9/2005 | Bassett et al. | |
| 6,953,526 B1 | 10/2005 | Fritze | |
| 6,977,039 B2 | 12/2005 | Knoll et al. | |
| 7,147,773 B2 | 12/2006 | Mitchell et al. | |
| 7,513,996 B2 | 4/2009 | Kloos et al. | |
| 2002/0017497 A1 | 2/2002 | Fritze | |
| 2002/0027102 A1 * | 3/2002 | Robillard | 210/493.1 |
| 2002/0179521 A1 * | 12/2002 | Paul | 210/457 |
| 2004/0211717 A1 | 10/2004 | Mitchell et al. | |
| 2004/0211931 A1 | 10/2004 | Olson et al. | |
| 2004/0238428 A1 | 12/2004 | Fritze | |
| 2005/0035042 A1 | 2/2005 | Rowe et al. | |
| 2005/0067342 A1 | 3/2005 | Bassett et al. | |
| 2005/0103697 A1 | 5/2005 | Magnusson et al. | |
| 2005/0230300 A1 | 10/2005 | Kato | |
| 2005/0252841 A1 | 11/2005 | Bassett et al. | |
| 2006/0000754 A1 | 1/2006 | Kang et al. | |
| 2006/0091047 A1 | 5/2006 | Ye | |
| 2007/0284296 A1 | 12/2007 | Swain et al. | |
| 2009/0001013 A1 | 1/2009 | Kloos et al. | |
| 2009/0008931 A1 | 1/2009 | Kloos et al. | |

* cited by examiner

WATER PURIFYING APPARATUSES

BACKGROUND OF THE INVENTION

1. Field of the Invention

The present invention relates to a water purifying apparatus and more specifically, to an inline water purifying device that facilitates the replacement of a filter cartridge without cutting off the flow pipe.

2. Description of Prior Art

In accordance with conventional technology, a water purifying apparatus is typically connected inline with a water supply pipe and has an inlet and an outlet where raw water is directed into the water purifying apparatus via the inlet from the water supply system. The raw water flows through a filter cartridge in the water purifying apparatus to purify the raw water. The purified water flows out of the water purifying apparatus for drinking or other uses. Due to the inline connection, the apparatus can be easily mounted to be a part of the water supply pipe line and hidden in a cabinet without occupying extra space.

But after the water purifying apparatus has been used for a certain term or period of time, the filter cartridge in the water purifying apparatus needs to be replaced Typically, the apparatus has to be dismantled from the pipe line to replace the filter cartridge. Before the apparatus is removed from the pipe line, the water running in the pipe line must be shut off. Therefore, a valve must be installed in the pipe line to shut off the water. If there is not a valve, the water in the pipe line will discharge from the water pipe when the apparatus is being removed from the pipe line. On the other hand, if the water purifying apparatus is frequently dismounted or removed, the seals on the inlet and outlet of the water purifying apparatus can be damaged and leak. Frequent dismounting is also tedious for a customer causing them to further dislike using such an apparatus.

OBJECTS AND SUMMARY OF THE INVENTION

It is therefore the main object of the present invention to provide an inline water purifying apparatus that facilitates the replacement of a filter cartridge without having to cut off the flow pipe.

The present invention provides a water purifying apparatus, which is comprised of a mounting head, a reversing valve and a filter; wherein the mounting head has an inlet connecting to the water supply pipes. The reversing valve includes a valve seat and a valve cartridge where the valve seat is fastened on the mounting head and accommodates the inlet and outlet The valve cartridge is set on the seat swinging between the valve seat and the mounting head accommodating the inlet and the outlet of the mounting head. The replaceable filter is secured on the mounting head so as to exactly mate the inlet and outlet of the filter to the inlet and outlet of the mounting head By turning the filter, the valve cartridge can be turned to control the inlet of the mounting head to be connected to or cut off from the inlet of the valve seat. The inlet of the filter housing is connected to the outside wall of the filter element, and the outlet of the filter housing is connected to the center of the filter element.

The valve seat has a column base with a blind hole defined by on its bottom side for containing the valve cartridge Meanwhile the blind hole extends its inner side to and via a through-hole to form a "7"-shaped water exit passage, and another through-hole set upon the opposite side to form a converted "7"-shaped entrance passage Two lugs separately extend from the valve seat on opposing outer sides for locating the valve seat on the mounting head.

The valve cartridge is a disk with two shaft heads extending upwardly and downwardly from the center on both sides of the cartridge. The upper shaft head fits into the blind hole of the valve seat and has an outlet that corresponds to the outlet. The lower shaft head defines a central blind hole that connects to one side of the outlet of the upper shaft head to form the converted "7"-shaped exit passage. The disk extends as a side shaft built on one side of the lower shaft head and forms an inlet at their center axes to connect to the inlet of the valve seat.

The side shaft including a dog lug extending from an outside wall of the side shaft.

The lower shaft head of the valve seat has a dog lug extending from one side near the disk.

The filter cartridge includes a filter housing and a filter element. The filter housing is a cylindrical shell which has a bottleneck built upon the top side for holding in the retaining socket of the mounting head The filter housing also includes an inlet, an outlet and a slot that correspond to the lower shaft head and side shaft of the valve cartridge, in which the inlet and outlet are connected to the inner hollow cave of the filter housing holding a filter element therein. The filter element has a hollow center covered separately with an upper cap and a bottom cap. The upper cap has an upwardly extending outlet spout that connects to the inside center of the bottom end of the filter element where the upper end is docked with the outlet of the valve seat.

The mounting head has bevel lugs on the bottom inside wall that correspond to bevel flanged segments for mating.

The mounting head has retaining slots on an inside surface for locating the lugs of the valve seat.

The mounting head also has a locating surface for locating the valve cartridge where the mounting head defines a through-hole and a through-slot and the through-slot extends out locating a silent point on the side.

The mounting head and the filter have several pair of mated grooves and lugs built upon the bevel lugs and bevel flanged segments separately for gearing together.

To apply the dismounted design of the present invention, the mounting head is aligned on a flow pipe. To replace the filter cartridge, a user just needs to twist off the filter and replace it with a new one On the other hand, the mounting head includes a reversing valve, in which the valve cartridge can be turned relatively when securing the filter in place on the mounting head The filter will hold and align the inlet of the filter element with the inlet of the valve seat to form a flow passage. When turning off the filter, the filter element of the filter and the valve cartridge are turned together to move the inlet of the valve cartridge away from the inlet of the valve seat thereby cutting off the water flow and preventing the flow pipe from jetting out water. This allows a user to be able to replace the filter without turning off the flow pipe individually. Therefore, the filter can be replaced without having to dismount the mounting head from flow pipe. The operation of the present invention is simplified and the inlet and outlet of the mounting head are kept in tight seal, to overcome the shortcomings of the prior art without leakage.

DETAILED DESCRIPTION OF PREFERRED EMBODIMENTS

Referring to FIGS. 1-5, a water purifying apparatus provided by the present invention is comprised of a mounting head A, a reversing valve B and a filter C.

Figure 1:
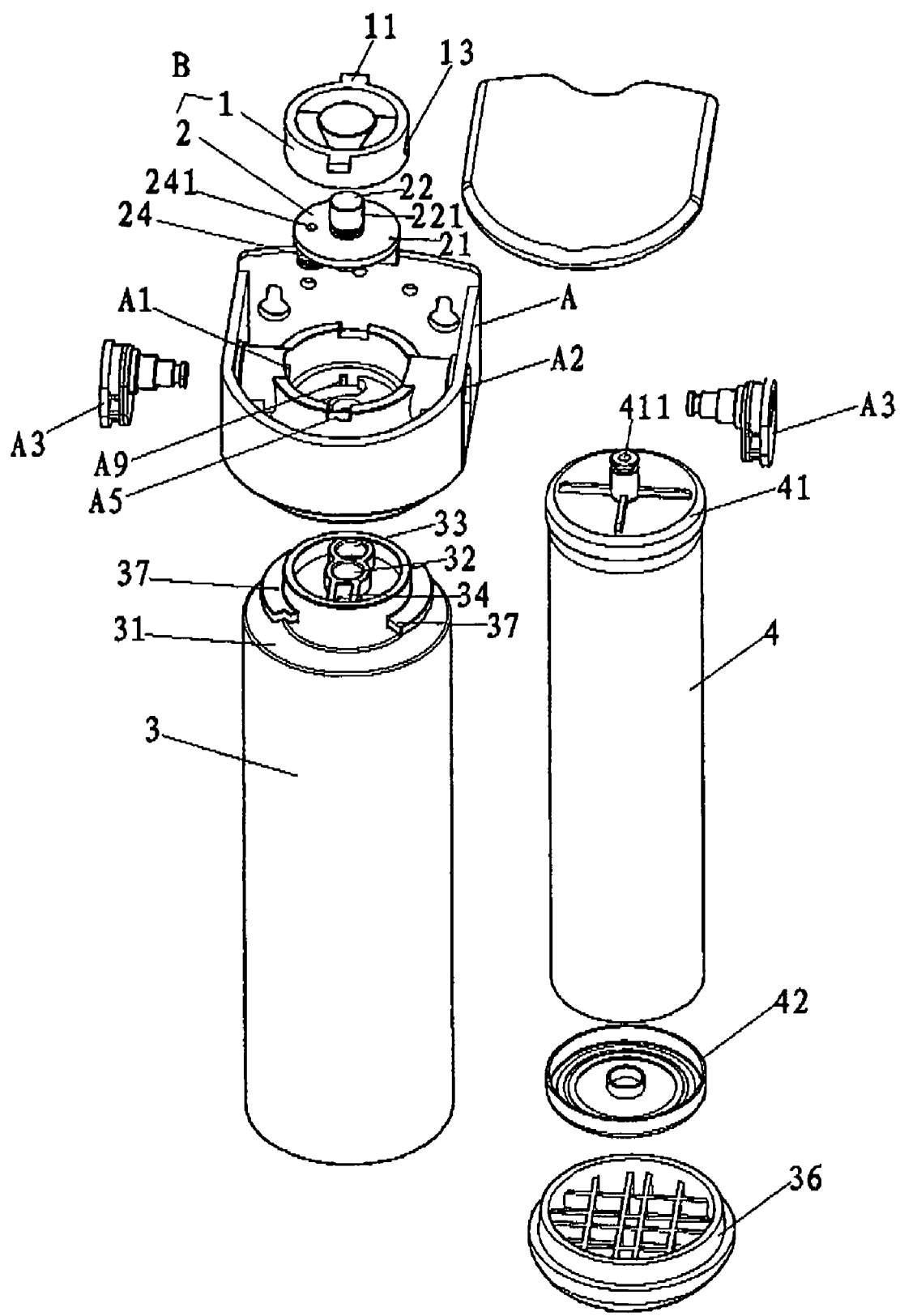
FIG. 1 is an exploded view of the present invention.
Figure 2A:
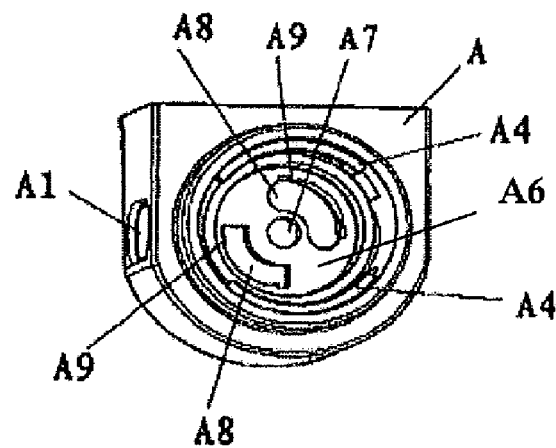
FIG. 2A is a perspective view of the mounting head of the present invention.
Figure 2B:
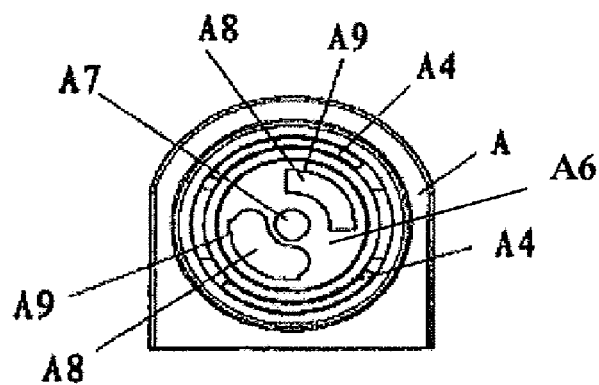
FIG. 2B is a top view of the mounting head of FIG. 2A.
Figure 2C:
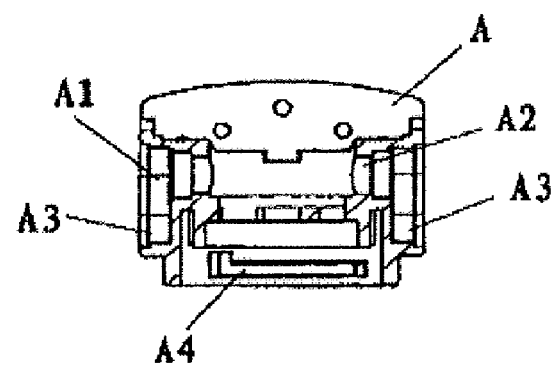
FIG. 2C is a cross-section view of the mounting head taken substantially along line 2C-2C shown in FIG. 2A.

Referring to FIGS. 2A-2C, the mounting head A has an inlet A1 and outlet A2 built on both sides of the mounting head and is secured with joint A3 respectively and oppositely (as shown in FIG. 1) The joints A3 are used for rapidly joining the mounting head to the flow pipe. The mounting head also includes bevel lugs A4 built upon the inside wall of the bottom portion of the mounting head A, a retaining slot A5 for holding the valve seat 1 of reversing valve B, and a locating surface A6 at proper position for locating the reversing valve B. The locating surface A6 defines a through-hole A7 and through-slots A8, where the through-slots A8 extend to and locate silent point A9, which is built upon the side so the slots.

The reversing valve B is includes a valve seat 1 and a valve cartridge 2.

Figure 3A:
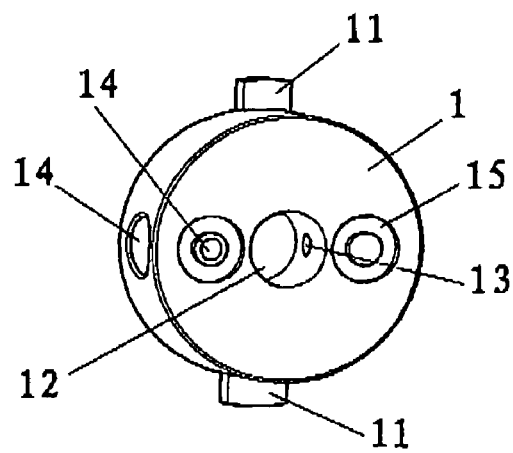
FIG. 3A is a perspective view of the valve seat of the present invention.
Figure 3B:
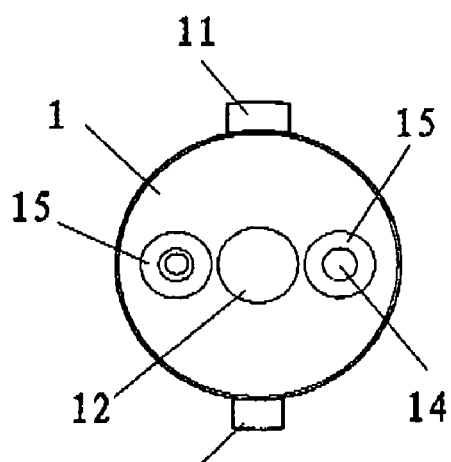
FIG. 3B is a bottom view of the valve seat shown in FIG. 3A.
Figure 3C:
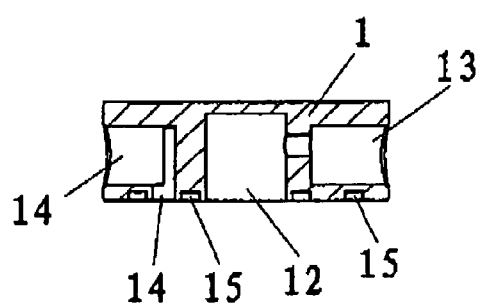
FIG. 3C is a partial cross-section view of the valve seat taken substantially along line 3C-3C shown in FIG. 3A.

Referring to FIGS. 3A-3C, the valve seat 1 has a column base with two lugs 11 extending separately on opposing outer sides for locating the valve seat in the retaining slot A5 of the mounting head A The bottom side of the valve seat 1 defines a blind hole 12 for containing the valve cartridge 2. The blind hole 12 is connected to the outside surface via a through-hole to form a "7"-shaped outlet 13, and another through-hole set upon the opposite side to form a converted "7"-shaped inlet 14 Two ring grooves 15 are built upon the bottom side of the valve seat for holding O-rings for sealing.

Figure 4A:
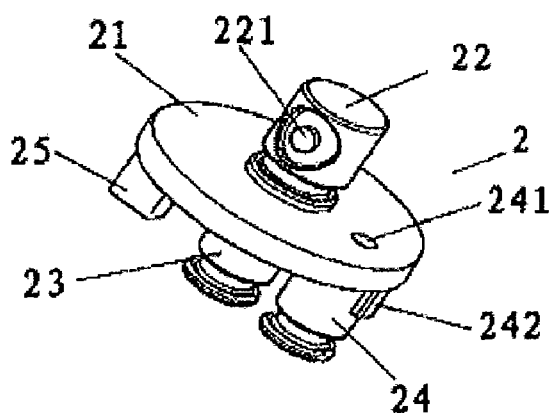
FIG. 4A is a perspective view of the valve cartridge of the present invention.
Figure 4B:
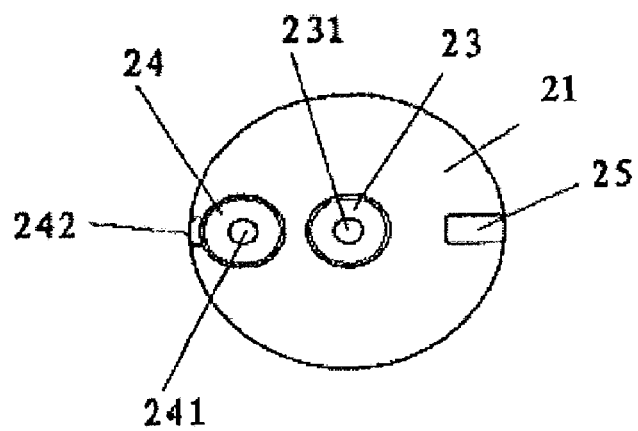
FIG. 4B is a bottom view of the valve cartridge of FIG. 4A.
Figure 4C:
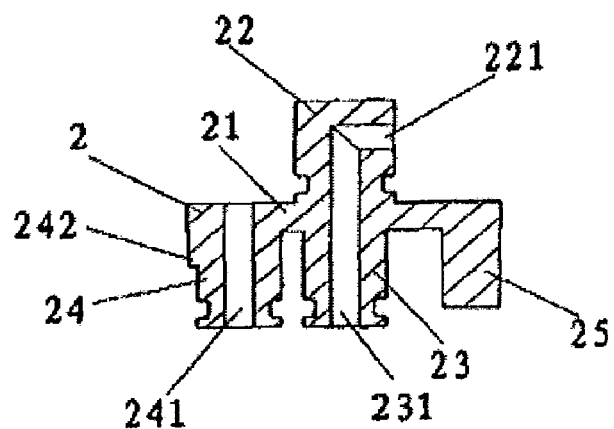
FIG. 4C is a cross-section view of the valve cartridge taken substantially along line 4C-4C in FIG. 4A.

Referring to FIGS. 4A-4C, the valve cartridge 2 includes a disk 21 with two shaft heads 22 and 23 extending from the center on opposing sides of the disk, therein the upper shaft head 22 is used to fit into the blind hole 12 of the valve seat 1 and corresponds to the outlet 13 with an outlet 221 built upon one side of the upper shaft head 22. The lower shaft head 23 has a central blind hole 231 connected to side outlet 221 of the upper shaft head 22 to form the converted "7"-shaped exit passage. The disk 21 of the valve cartridge 2 also includes a side shaft 24 built on one side of the lower shaft head 23. The side shaft 24 forms an inlet 241 at a center axis that connects to the inlet 14 of the valve seat 1. The side shaft 24 includes a dog lug 242 extending from the outside wall, and the lower shaft head 23 has a downward dog lug 25 built upon the bottom side of the disk 21.

The filter C includes a filter housing 3 and a filter element 4.

Figure 5A:
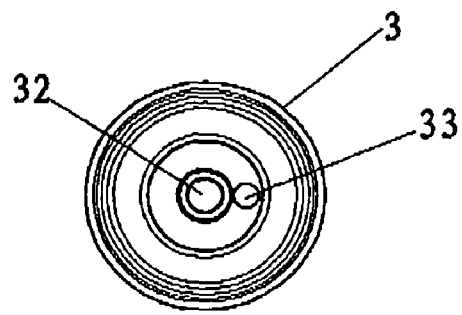
FIG. 5A is a bottom view of the filter cartridge of the present invention.
Figure 5B:
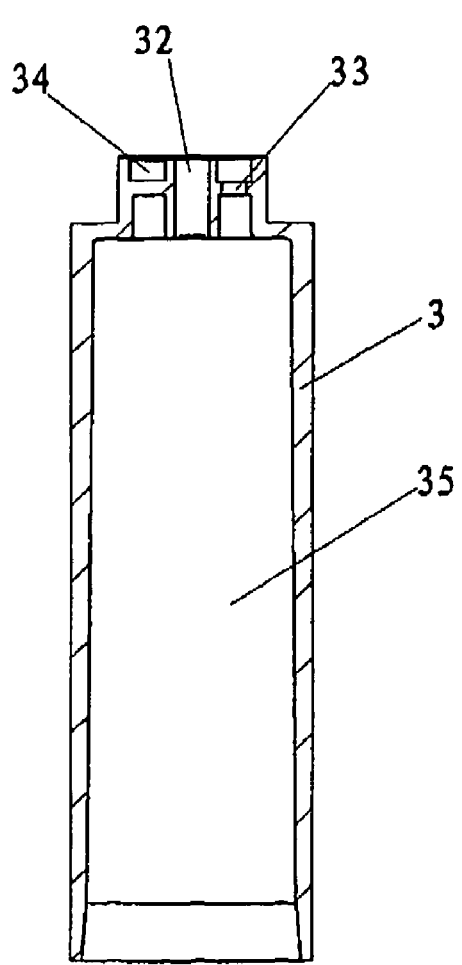
FIG. 5B is a cross-section view of the filter cartridge taken substantially along line 5B-5B shown in FIG. 5A.
Figure 5C:
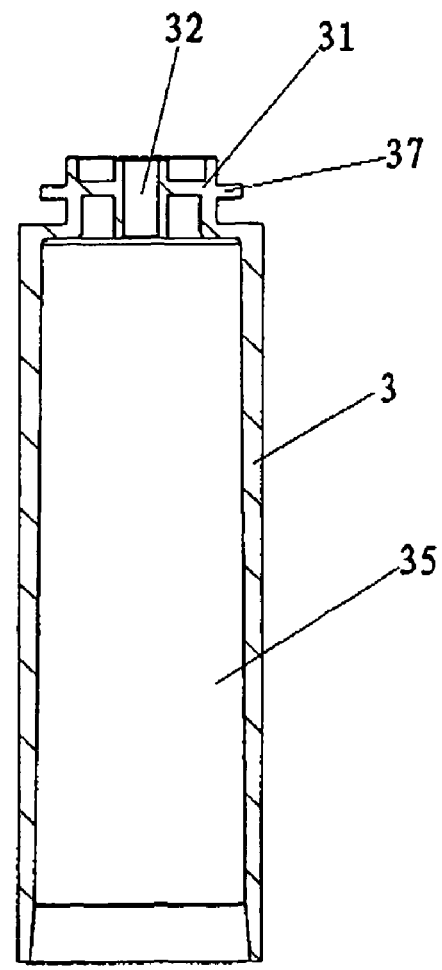
FIG. 5C is a cross-section view showing the opposing side of filter cartridge of FIG. 5B.

Referring to FIGS. 5A-5C, the filter housing 3 has a bottleneck 31 extending from a top side for holding in the retaining socket of the mounting head A. The bottleneck 31 is aligned with the lower shaft head 23, the side shaft 24 and the dog lug 25 of the valve cartridge 2, the inlet 33, outlet 32 and the slot 34 on the top side of the filter housing and connecting to the hollow cave 35. The hollow filter housing 3 is covered with a bottom cover 36 for holding the filter element 4 in the housing. On the other hand, the filter housing 3 has bevel flanged segments 37 along the edge on the top end above the bottleneck 31 that correspond to and align with bevel lugs A4 of the mounting head A.

The filter element 4 has a hollow center that is separately covered with an upper cap 41 and a lower cap 42. The upper cap 41 has an outlet spout 411 in communication with the inner hollow center and the upper end is docked with the outlet 32 of the filter housing 3.

Figure 6:
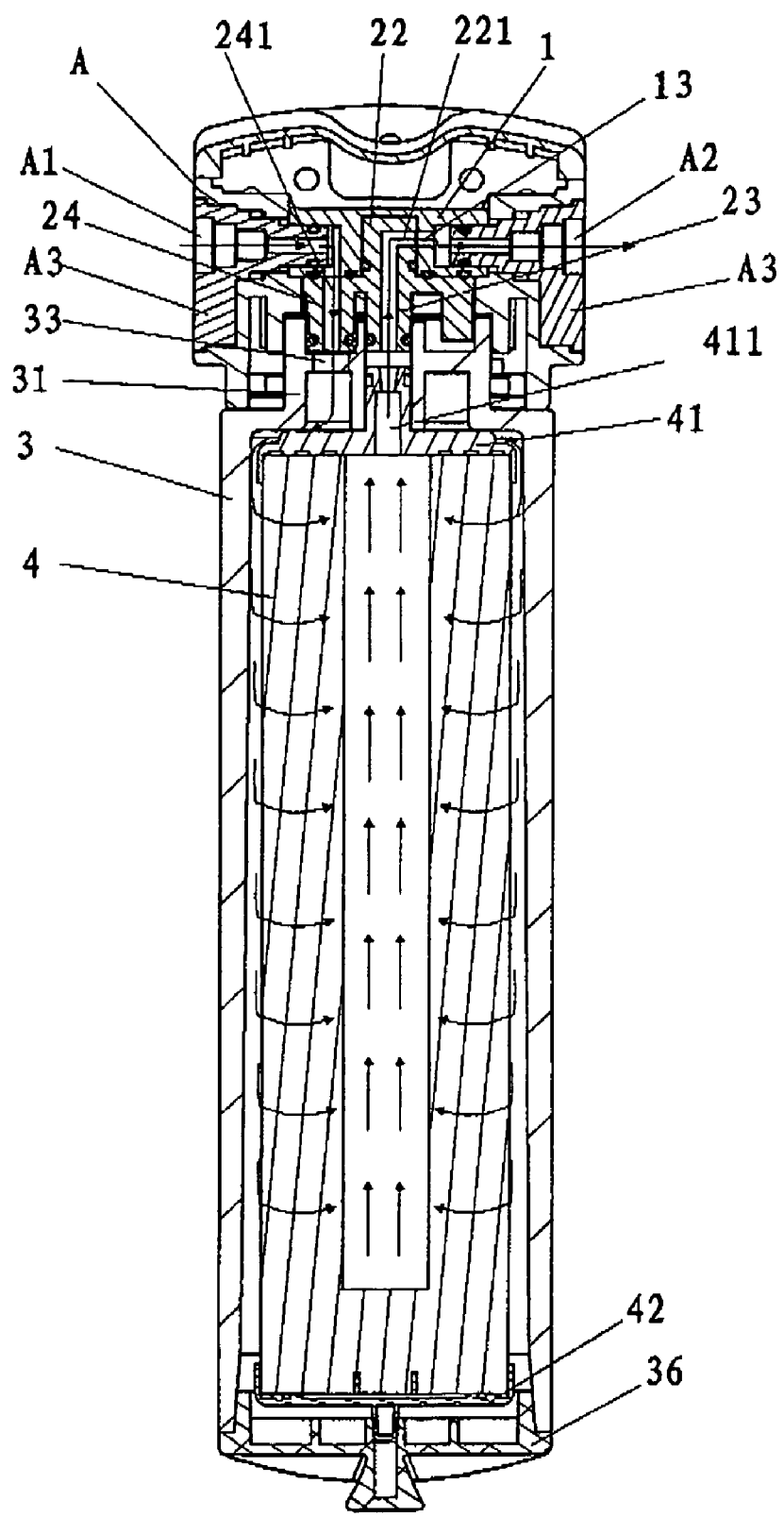
FIG. 6 is a schematic diagram showing the filter cartridge on a pipe line in the "on" position.

Referring to FIG. 6, in combination, the valve seat 1 is located or positioned in the mounting head A by first fitting the two lugs 11 into the retaining slot A5. The movable valve cartridge 2 is located between the valve seat 1 and the mounting head A by fitting the upper shaft head 22 into the blind hole 32 and backing up the locating surface A6. The lower shaft head 23, the side shaft 24 and the dog lug 25 of the valve cartridge 2 are stretched out from the through-hole A7 and the through-slot A8 of the locating surface A6 on the bottom side of the mounting head A. The filter element 4 is located inside the filter housing 3 with the upper and lower covers, and secured by the bottom cover 36, so that the lower shaft head 23, the side shaft 24 and the dog lug 25 respectively extend into the corresponding inlet 33, outlet 32 and the slot 34 holding the dog lug 25 of the filter housing 3. The filter housing 3 is secured on a retaining socket constructed of the bevel lugs 37 of the valve seat 1, by the matched dog lug 25 and the slot 34. The filter housing 3 and the filter element 4 turn together, further taking advantage of the locating silent points A9 on the through-slots A8 locating the dog lug 242 of the side shaft 24 and the dog lug 25 synchronously. The filter housing 3 is retained on the base A while the filter element 2 is placed in the cutting-in state or "on" position. In this state or position, the inlet 241 exactly aligns with the inlet 12 of the valve seat 1 so that the water can be led or flow freely between the inlets.

Certainly, all of the pieces should be sealed on the contacting surfaces (with sealing washes and O-rings) as in a combination process.

As in a water purifying treatment, the water flowing in the flow pipe first enters the flow passage of the reversing valve B via the inlet 11 of the valve seat 1, then passes through the on-state inlets 241 and 12 of the valve cartridge 2 and the valve seat 1, via the inlet 33 of the filter housing 3 and enters the inner cave 35 to fill the outside space of the filter element 4. Under the water pressure, the raw water continuously permeates into the hollow center of the filter element 4, and then along the outlet spout 411 set upon the top end of the filter element 4. The clarified or purified water is led out, via the outlets 32, 221 and 13 of the filter housing 3, the valve cartridge 2 and the valve seat 1, and then finally passes through the outlet A2 of the mounting head A to flow into the down pipe for tapping out.

Figure 7:
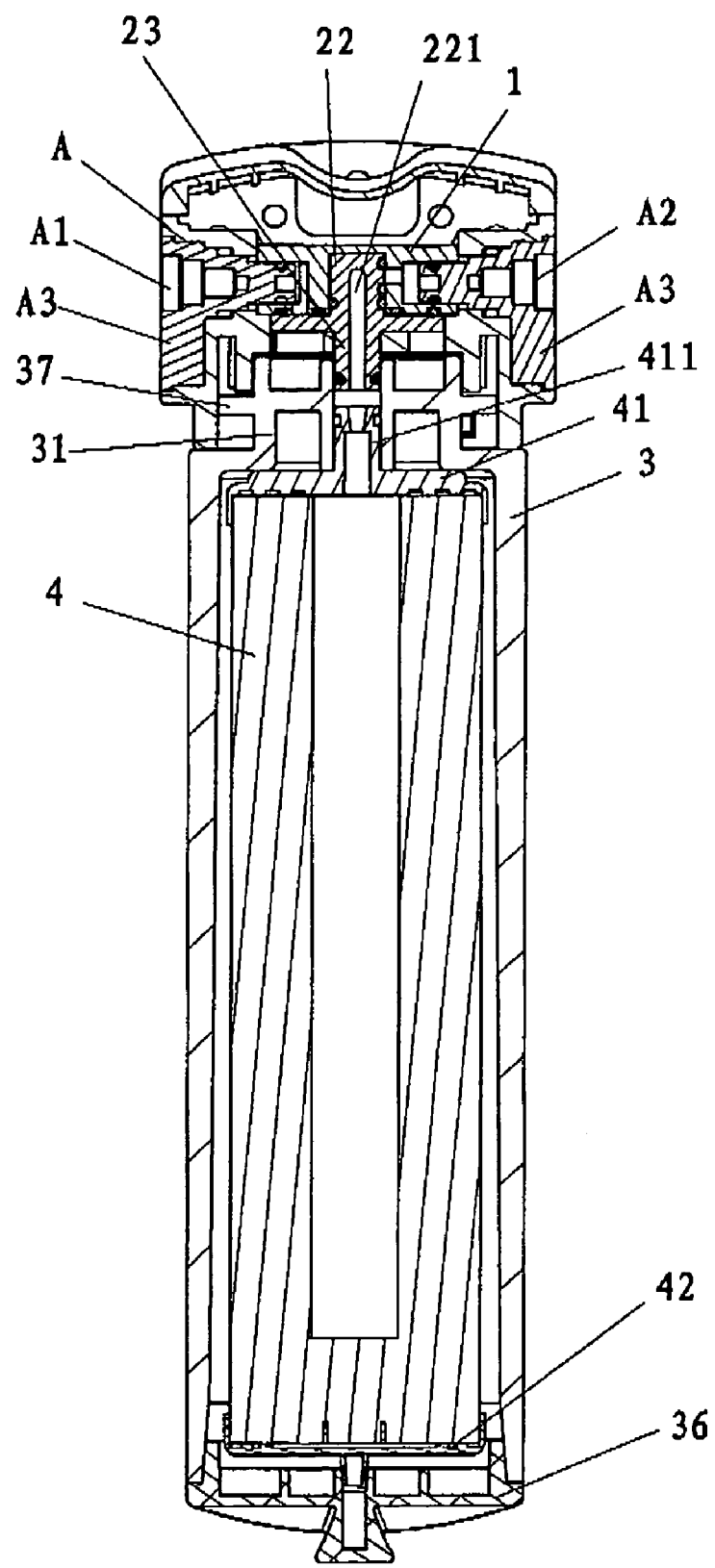
FIG. 7 is a schematic diagram showing the filter cartridge on the pipe line in the "off" position.

Referring to FIG. 7, to replace the filter cartridge 4, a user just needs to twist off the filter cartridge 4 to take it away from the mounting head A to replace it with a new filter cartridge. Turning the filter housing 3, synchronously turns the valve cartridge 2 under the driving of the filter housing 3, by the dog lug 24 of the valve cartridge 2 facilitating the filter housing 3 to turn the valve cartridge 2. As a result, the inlet 241 of the valve cartridge 2 turns away from the inlet 14 of the valve seat 1 falling into cutting-off state or "off position. When the valve cartridge 2 is turned to get the locating surface A6 on the other end of the through-slot A8, the silent points A9 will locate the side shaft 24 and the dog lug 25 in another slot A8, where the filter housing 3 can then be taken away. In this case, the valve cartridge 2 is in the cutting-off state or in the "off position, so that the water coming from the flow pipe is blocked without any jetting out or leakage. Even if the flow pipe is not turned off, the water will not jet out when replacing the filter.

Additionally, to improve and ensure a tight connection and seal, the mounting head A and the filter cartridge 4 have several pair of mated grooves and lugs separately built upon the bevel lugs A4 and bevel flanged segments 37.

We claim:

1. A filter cartridge and head assembly, comprising:
   a head housing defining a valve cavity and having a water inlet and a water outlet;
   a valve disposed in said housing and defining transversally aligned inlet and outlet passageways, and having a first key formation that vertically depends from said valve;
   a cartridge having transversely separated inlet and outlet ports transversely aligned relative to a longitudinal axis of the cartridge, each said port engageable in a corresponding one of said passageways, and a complementary key formation for engaging said first key formation for ensuring proper engagement of said ports in said passageways, said ports and said key formation each projecting from an upper surface on said cartridge in a common plane, one of said inlet and outlet ports being positioned between said other of said inlet and outlet ports and said complementary key formation;
   said valve being rotatable in said housing between an open position in which feed water passes through said inlet passageway and into said cartridge, and treated water flows to said outlet passageway, and a closed position in which water is prevented from flowing to and from said valve;
   said inlet and outlet passageways and said first key formation being generally linearly aligned transversely to said axis.

2. The filter assembly of claim 1 wherein said assembly further includes a valve cap securable to said head housing for rotatably retaining said valve in said cavity.

3. The filter assembly of claim 1 wherein said valve cavity is configured for matingly and rotatably receiving a generally vertically projecting outlet portion of said valve.

4. The filter assembly of claim 3 further including seal means on said vertically projecting outlet portion for separating source water entering said inlet port from treated water passing through at least one of said outlet port and said valve cavity.

5. The filter assembly of claim 1 wherein said valve includes a vertically projecting outlet portion, a generally disk-shaped divider radially projecting from said outlet portion, said first key formation and said outlet passageway depend from said divider.

6. The filter assembly of claim 5 wherein said divider is rotatably engaged against a surface on said head housing, and a seal is provided for sealing said inlet against said divider.

7. The filter assembly of claim 1 wherein said cartridge has a pair of radially extending locking lugs, and said head housing defines a pair of spaced, radially inwardly projecting locking platforms for engaging said locking lugs for physically retaining said cartridge to said head housing.

8. The filter assembly of claim 7 further including a valve cap securable to said head housing for rotatably retaining said valve in said cavity, said valve cap being mounted within said head housing to be vertically displaced from said locking platforms.

9. The filter assembly of claim 1 where said valve is constructed and arranged so that one of said inlet and outlet passageways is axially positioned, and the other of said inlet and outlet passageways and said key formation are linearly positioned on opposite sides of said axially positioned passageway.

10. The filter assembly of claim 1 wherein said first key formation is a lug, and said complementary key formation is a recess configured for matingly engaging at least a portion of said lug.

11. A filter cartridge for use in a filter assembly including a head housing having a water inlet and a water outlet, a valve rotatably disposed in the housing and defining inlet and outlet passageways respectively in fluid communication with the inlet and outlet, and a first key formation being generally linearly aligned with the inlet and outlet passageways, the inlet and outlet being transversely aligned and the valve being rotatable within the head housing between an open position permitting water flow into the inlet passageway from the inlet and a closed position in which water is prevented from flowing into the inlet passageway and backwards from the housing outlet, comprising:
   an inlet port, an outlet port and a complementary key formation being disposed for respective mating engagement in the inlet and outlet passageways and receiving the first key formation, said ports and said key formation each projecting vertically from an upper surface in a common plane at an upper end of said cartridge and being in general linear alignment with each other transverse to a vertical axis of said cartridge so that insertion of said cartridge into the valve body and rotation with the valve body relative to the head housing will selectively place at least said inlet port into and out of communication with the water inlet.

12. The cartridge of claim 11 wherein said inlet port and said outlet port are adjacent each other and project vertically from a first end of said cartridge.

13. The cartridge of claim 11 further including at least one locking lug radially projecting from said first end of said cartridge.

14. The cartridge of claim 13 further including a generally cylindrical extension projecting from said first end and separating said at least one locking lug from said inlet and outlet ports and said complementary key formation.

15. The cartridge of claim 13 wherein said complementary key formation is a recess including a wall projecting vertically from a cylindrical extension.

16. The cartridge of claim 11 wherein one of said inlet and outlet passageways is axially positioned, and the other of said inlet and outlet passageways and said complementary key formation are linearly positioned on opposite sides of said axially positioned passageway.

17. A head housing for use in a filter assembly including said housing and a filter cartridge having an inlet port and an outlet port that are transversely aligned, and a complementary key formation being disposed for respective mating engagement in said housing and engaging a mating formation in said head housing, the cartridge ports and the recess being in general linear alignment with each other so that insertion of the cartridge into the housing and rotation relative to the head housing will selectively place at least the inlet port into and out of communication with a water inlet, said housing comprising:
- a head housing having a water inlet and a water outlet, and defining a valve cavity;
- a valve defining inlet and outlet passageways, having a first key formation, said inlet and outlet passageways and said first key formation being generally linearly aligned transverse to a vertical axis of said valve, said first key formation being spaced from said inlet and said outlet passageways;
- said valve being rotatable in said housing between an open position in which feed water passes into said inlet passage and into said cartridge, and treated water flows to said water outlet, and a closed position in which water is prevented from flowing into said inlet passageway and backwards from said housing outlet; and
- a valve cap securable to said head housing for rotatably retaining said valve in said cavity.

* * * * *